United States Patent [19]

Hayashi et al.

[11] Patent Number: 4,463,721
[45] Date of Patent: Aug. 7, 1984

[54] VIBRATION SUPPRESSION SYSTEM FOR DIESEL ENGINE

[75] Inventors: Yoshimasa Hayashi, Kamakura; Kiyoshi Shimada, Yokosuka, both of Japan

[73] Assignee: Nissan Motor Company, Limited, Yokohama, Japan

[21] Appl. No.: 477,742

[22] Filed: Mar. 22, 1983

[30] Foreign Application Priority Data

Mar. 26, 1982 [JP] Japan .................. 57-48382

[51] Int. Cl.³ .............................................. F02D 1/04
[52] U.S. Cl. ................................... 123/378; 123/556; 123/552
[58] Field of Search ............... 123/556, 557, 549, 552, 123/389, 378, 376

[56] References Cited

U.S. PATENT DOCUMENTS

| 1,211,087 | 1/1917 | Clark | 123/556 |
| 2,139,777 | 12/1938 | Skok | 123/549 |
| 2,414,296 | 1/1947 | Gill | 123/556 |
| 2,664,868 | 1/1954 | Lautzenhiser | 123/378 |
| 3,157,167 | 11/1964 | Walker et al. | |
| 4,058,101 | 11/1977 | Taira | 123/382 |
| 4,354,464 | 10/1982 | Fujita | |
| 4,354,465 | 10/1982 | Takeuchi | 123/389 |
| 4,391,246 | 7/1983 | Kawabata | 123/378 |
| 4,426,972 | 1/1984 | Kimura | 123/556 |

FOREIGN PATENT DOCUMENTS

| 450459 | 11/1971 | Australia . |
| 2323889 | 8/1977 | France . |
| 457035 | 7/1968 | Switzerland . |

Primary Examiner—Ronald H. Lazarus
Attorney, Agent, or Firm—Schwartz, Jeffery, Schwaab, Mack, Blumenthal & Koch

[57] ABSTRACT

A vibration suppression system for a diesel engine comprises a first device for decreasing the amount of intake air to be inducted into the engine when operated. A second device is provided to heat the intake air when operated. Additionally, a third device is provided to detect a low engine speed and low engine load operating range, and to produce a signal in response thereto. The first and second devices are operated in response to the signal from the third device, thereby avoiding irregular combustion and misfire while suppressing engine speed fluctuation and torque fluctuation.

14 Claims, 17 Drawing Figures

VIBRATION SUPPRESSION SYSTEM FOR DIESEL ENGINE

BACKGROUND OF THE INVENTION

1. Field of the Invention

This invention relates generally to an improvement in a diesel engine, and more particularly to a system for suppressing the vibration of the diesel engine.

2. Description of the Prior Art

In general, diesel engines employ so-called compression ignition and are two to three times higher in compression ratio than spark ignition engines such as gasoline or petrol fueled engines. Accordingly, the work done during the compression stroke becomes much greater, thereby causing torque fluctuation and engine speed fluctuation. This tendency is conspicuous particularly at engine idling, constituting a cause for increasing engine vibration. In addition, since the diesel engine is usually not provided with an intake air throttle valve, intake air noise is released out without being damped. The thus released noise is offensive to the ear, particularly at idling during which the level of the other noise is relatively low.

SUMMARY OF THE INVENTION

A vibration supression system for a diesel engine, according to the present invention comprises a first device for decreasing the amount of intake air to be induced into the engine when operated. A second device is provided to heat the intake air when operated. Additionally, a third device is provided to detect a low engine speed and low engine load operating range of the engine to produce a signal. The first and second devices are operated in response to the signal from the third device. Accordingly, intake air is positively heated simultaneously with being throttled, thereby avoiding unstable combustion and misfire while suppressing engine speed fluctuation and torque fluctuation. Thus, engine vibration and noise can be greatly reduced while maintaining the stability of the engine operation.

BRIEF DESCRIPTION OF THE DRAWINGS

The features and advantages of the vibration suppression system according to the present invention will be more clearly appreciated from the following description taken in conjunction with the accompanying drawings in which like reference numerals designate like parts and elements, and in which.

DETAILED DESCRIPTION OF THE INVENTION

Figure 1:
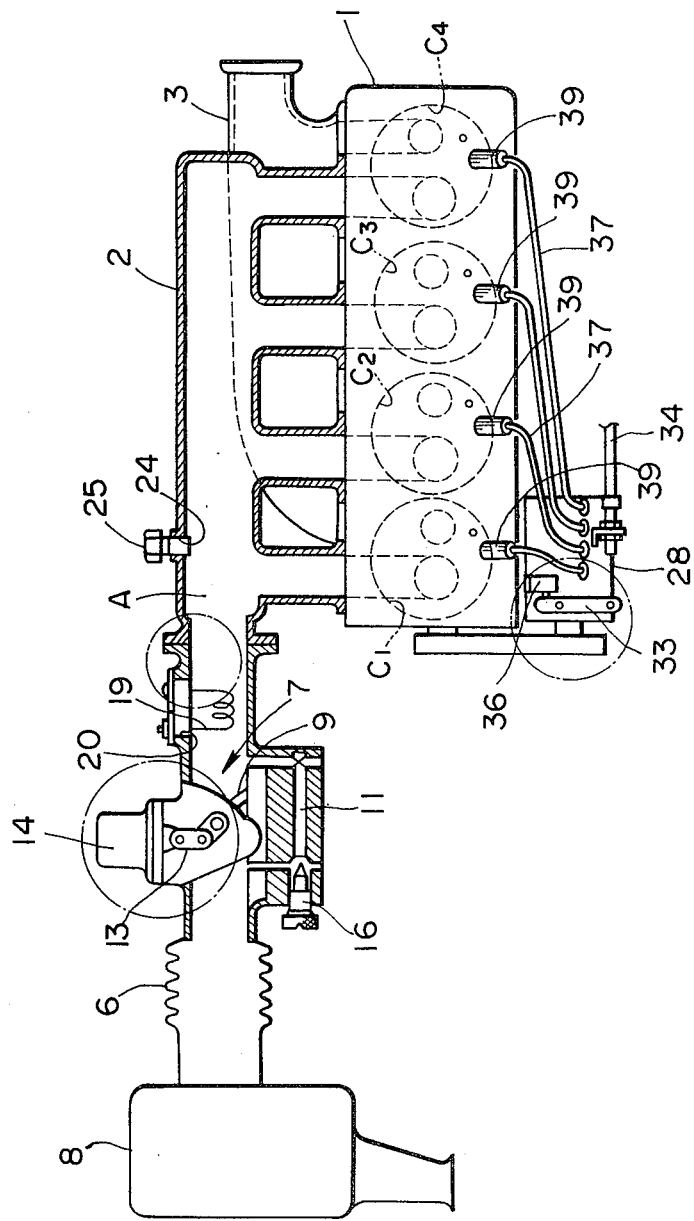
FIG. 1 is a plan view partly in section of a diesel engine provided with a preferred embodiment of a vibration suppression system in accordance with the present invention.
Figure 2:
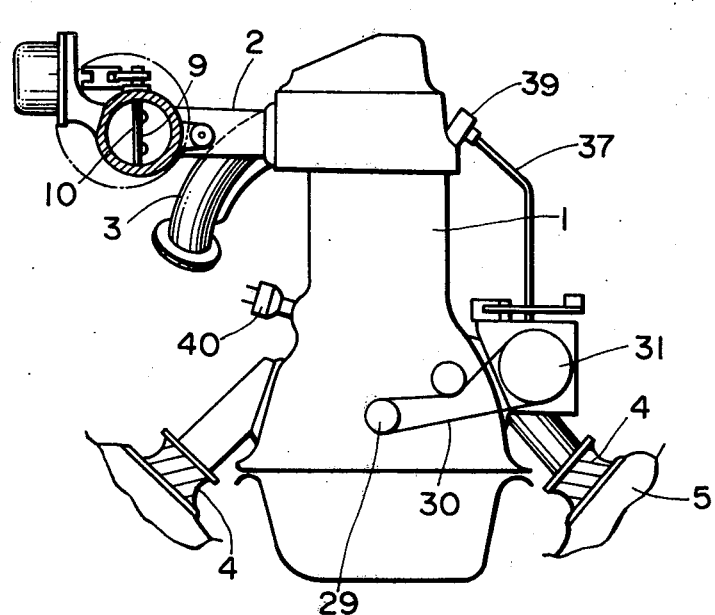
FIG. 2 is a front elevation of the engine of FIG. 1.
Figure 3:
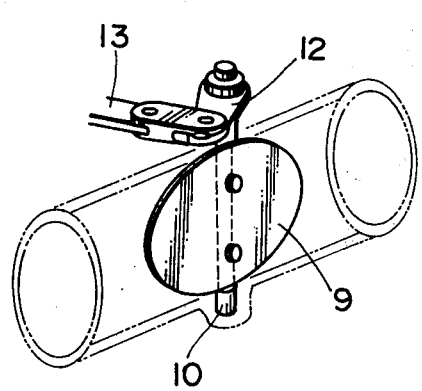
FIG. 3 is a perspective view of an intake throttle valve and its vicinity of the system of FIG. 1.

Referring now to FIGS. 1 to 13, particularly to FIGS. 1 and 2, there is a preferred embodiment of a noise suppression system for a four-cylinder type diesel or compression ignition engine, in accordance with the present invention. The diesel engine comprises an engine proper 1 which is provided with an intake manifold 2 and an exhaust manifold 3. The engine proper 1 is mounted through engine mount rubbers 4 on an automotive vehicle body 5. An air filter 8 is connected through a duct 6 to the upstream side of the intake manifold 2. A throttle chamber 7 is interposed between the duct 6 and the intake manifold 2 and forms part of an intake air passageway A through which atmospheric air (intake air) is inducted into the combustion chambers (no numerals) respectively defined in cylinders $C_1$, $C_2$, $C_3$ and $C_4$ of the engine proper 1. An intake air throttle valve or butterfly valve 9 is disposed within the throttle chamber 7 and fixedly mounted on a rotatable valve shaft 10 which is rotatably supported through the wall of the throttle chamber 7, so that the throttle valve is pivotally rotatable within the throttle chamber 7 or within the intake air passageway A as shown in FIG. 3. Additionally, an auxiliary air passage 11 is so formed as to bypass the throttle valve 9.

Figure 4:
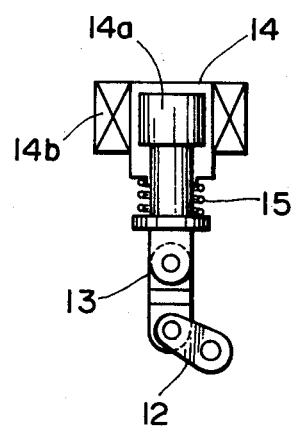
FIG. 4 is a schematic illustration of a device for operating the throttle valve of FIG. 3.

As shown in FIGS. 3 and 4, the valve shaft 10 is mechanically connected through a throttle lever 12 and a link 13 to a movable rod 14a of a solenoid actuator 14, so that the throttle valve 9 is fully closed when a solenoid 14b of the actuator 14 is energized. A return spring 15 is provided to restore the movable rod 14a to its original position when the solenoid 14b is de-energized.

Figure 5:
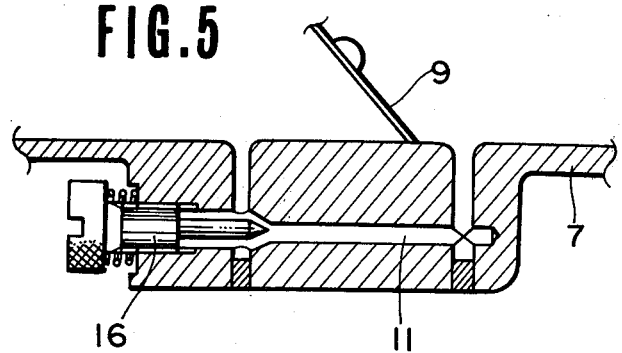
FIG. 5 is a sectional view showing an auxiliary air passage of the system of FIG. 1 which passage is formed to bypass the throttle valve of FIG. 3.

An adjustment screw 16 is, as best shown in FIG. 5, provided to adjust the effective passage area of the auxiliary air passage 11, thereby precisely adjusting the amount of intake air to be supplied to the combustion chambers to a predetermined value when the throttle valve 9 is fully closed, i.e., adjusting the vacuum prevailing in the intake air passageway A downstream of the throttle valve 9.

Figure 6:
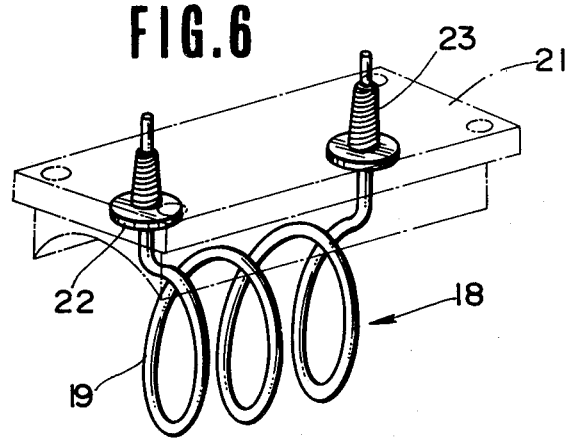
FIG. 6 is a perspective view of a heater of the system of FIG. 1.
Figure 7:
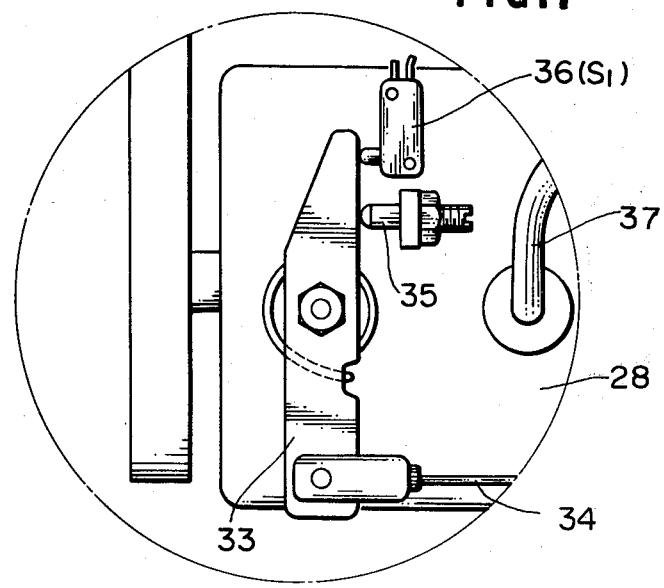
FIG. 7 is a side view of an essential part of a fuel injection pump of the engine of FIG. 1.

A sheathed heater 19 is disposed within the intake air passageway A downstream of the throttle valve 9 and the auxiliary air passage 11, forming a means 18 for heating intake air or combustion air. As best shown in FIG. 6, a sheathed heater 19 is fixedly installed on a base member 21 by means of nuts 22 in a manner that the terminals 23 of the heater 19 project outside the base member 21. The base member 21 is so formed as to fit in an installation opening 20, so that the base member 21 and the sheathed heater 19 constitute a single unit. The sheathed heater 19 is arranged to be, in principle, supplied with electric current so as to heat the intake air to be supplied to the combustion chambers only when the throttle valve 9 is fully closed, as discussed after.

The intake manifold 2 located downstream of the heater 19 is formed with a through-hole 24 which is usually closed with a plug 25. The through-hole 24 will be supplied with a vacuum measuring meter (not shown) when operating the adjustment screw 16 at the auxiliary air passage 11, in order to carry out air flow adjustment upon detecting intake manifold vacuum at the vacuum measuring meter.

Figure 8:
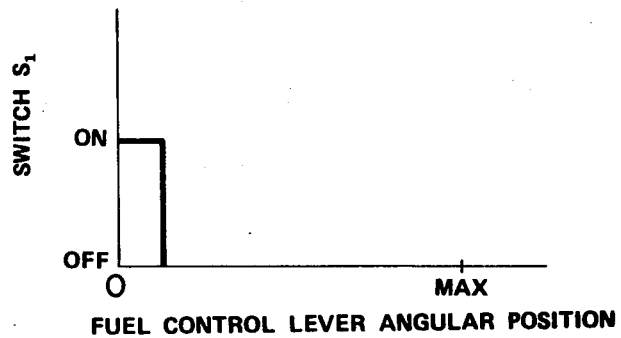
FIG. 8 is a graphical representation showing the operational characteristics of an idle detecting switch of the system of FIG. 1.

A fuel injection pump 28 includes a pump pulley 31 which is operatively connected through a cogged belt 30 with a crank pulley 29 of the engine proper 1, and consequently the fuel injection pump 28 is arranged to be driven in timed relation to the engine revolution. A fuel control lever 33 of the fuel injection pump 28 is mechanically connected through an acceleration wire 34 to an acceleration pedal (not shown) and so arranged as to increase the amount of fuel injection by being rotated counterclockwise in FIG. 7. An idle adjustment screw 35 is disposed to be contactable with the fuel control lever 33 so as to maintain a predetermined small angular (slightly opened) position of the fuel control lever 33 which angular position causes the engine to operate at idling. An idle detecting switch (engine load detected switch) 36 is disposed side by side with the idle adjustment screw 35. The idle detecting switch 36 is so arranged as to be switched ON when the fuel control lever 33 is at the predetermined small angular position as shown in FIG. 8. The idle detecting switch 36 serves to detect engine load and comprises a type of microswitch. High pressure fuel from the fuel injection pump 28 is supplied under pressure via pipings 37 to fuel injectors 39 at a timing in the vicinity of top dead center at compression stroke. Each injector 39 is disposed in the combustion chamber (or turbulence chamber) of each engine cylinder $C_1$, $C_2$, $C_3$ or $C_4$.

Figure 9:
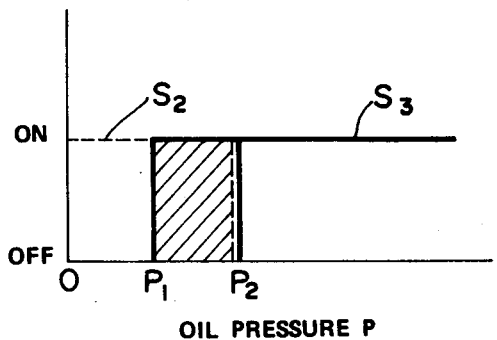
FIG. 9 is a graphical representation showing the operational characteristics of an oil pressure switch of the system of FIG. 1.
Figure 10:
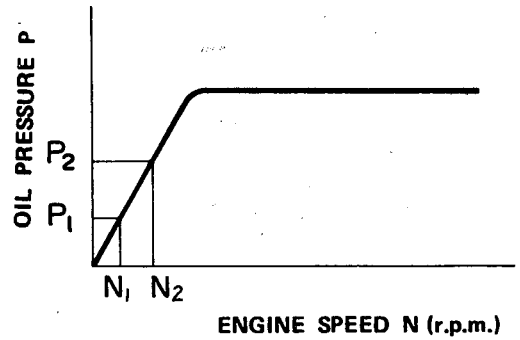
FIG. 10 is a graphical representation showing the relationship between oil pressure and engine speed of the engine of FIG. 1.
Figure 11:
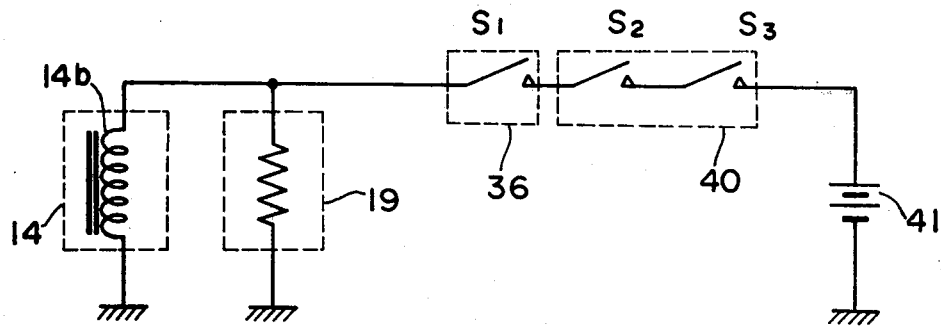
FIG. 11 is a circuit diagram of a control device of the system of FIG. 1.

As shown in FIG. 2, an oil pressure switch 40 is provided to detect the pressure of engine lubricating oil supplied from an oil pump (not shown) which is driven in timed relation to engine revolution. The oil pressure switch 40 has a contact $S_3$ which is closed when the engine lubricating oil pressure is at a first level $P_1$ or higher, and another contact $S_2$ which is closed when the engine lubricating oil pressure is at a second level $P_2$ or lower, the second level engine lubricating oil pressure $P_2$ being higher than the first level engine lubrication oil pressure $P_1$ as illustrated in FIG. 9. These two contacts $S_2$ and $S_3$ are connected in series with each other and therefore the oil pressure switch 40 is so arranged as to be switched ON when the lubricating oil pressure is between the levels $P_1$ and $P_2$. It will be understood that the range between the oil pressure levels $P_1$ and $P_2$ corresponds to a low engine speed range (between two engine speed levels $N_1$ and $N_2$) including engine speeds for idling as illustrated in FIG. 10. The contacts $S_2$, $S_3$ of the oil pressure switch 40 are electrically connected in series with the contact $S_1$ of the idle detecting switch (engine load detecting switch) 36 as shown in FIG. 11. Accordingly, electric current supply from a battery 40 to the solenoid actuator 14 and the sheathed heater 19 is controlled by these switches 36 and 40. Thus, only when all the contact points $S_1$, $S_2$ and $S_3$ are closed to cause the switches 36 and 40 to be switched ON, is the actuator solenoid 14b energized and the sheathed heater 19 supplied with electric current to be heated.

The manner of operation of the thus arranged system will be discussed hereinafter.

When the fuel control lever 33 of the fuel injection pump 28 is at its position other than at the predetermined small angular (slightly opened) position representing engine idling, or engine lubricating oil pressure is higher or lower than the range between the levels of $P_1$ and $P_2$ even under the predetermined small angular position of the fuel control lever 33, the idle detecting switch 36 and/or the oil pressure detecting switch 40 is switched OFF, so that the actuator solenoid 14b is not energized and sheathed heater 19 is not supplied with electric current. Thus, at engine operating range other than a low engine speed and low engine load operating range, the throttle valve 9 is fully opened and intake air heating is not carried out by the sheathed heater 19. As a result, the engine can operate like a usual diesel engine which is not provided with the vibration suppression system according to the present invention, thereby obtaining a sufficient charging efficiency of intake air.

Figure 12:
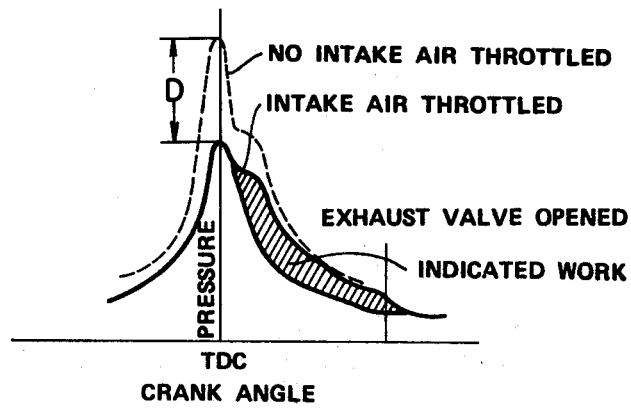
FIG. 12 is a graphical representation showing pressure variation within a cylinder of a diesel engine in terms of crankangle.

Conversely, at the low engine speed of low engine load operating range such as engine idling, all the contact $S_1$, $S_2$ and $S_3$ of the idle (load) detecting switch 36 and the oil pressure switch 40, and consequently the throttle valve 9 is fully closed and the sheathed heater 19 is supplied with electric current to be heated. Accordingly, intake air is inducted into the combustion chambers through the auxiliary air passage 11, and therefore the amount of the intake air is controlled to a small value. Such a small amount of intake air can be sufficiently heated by the heater 19. By virtue of the thus throttled intake air, as illustrated in FIG. 12, the compression pressure within the combustion chamber is relatively lowered (as indicated by a solid line) as compared with in a conventional case (as indicated by a dotted line) where intake air throttling is not carried out. Particularly, the work done at compression stroke is decreased by an amount corresponding to lowered peak pressure, thereby suppressing engine speed fluctuation and torque fluctuation. This greatly lowers the vibrational force of the engine proper 1 and consequently reduces engine vibration. In FIG. 12, the character D indicates a range in which engine speed is lowered since torque is used for compression.

It will be understood that since the fuel injection amount is less at idling, the air-fuel mixture has an ample supply of air, and a sufficient intake air amount can be attained even with the throttled intake air. The thus lowered compression pressure due to throttling the intake air lowers intake air temperature, so that it the engine may become liable to unstable ignition of injected fuel and irregular combustion. However, according to the present invention, since the intake air throttling and intake air heating are simultaneously carried out, the temperature of the intake air becomes relatively high thereby to compensate the lowered amount of the compression pressure. As a result, the stability of combustion is maintained at a high level, thereby avoiding vibration and torque fluctuation due to irregular combustion etc.

It is preferable that the intake air throttling and the intake air heating are not carried out at engine deceleration or engine cranking even in a low load engine operating range, or at engine acceleration during vehicle starting even in a low engine speed operating range. This is because during engine deceleration when the idle detecting switch 36 is switched ON and the oil pressure switch 40 is switched OFF, it is desirable to increase the work for compression in order to improve the effect of engine brake. During engine cranking when the idle detecting switch 36 is switched ON and the oil pressure switch 40 is switched OFF due to too low engine lubrication oil pressure, it is required to raise the compression pressure in order to facilitate engine starting, and during vehicle starting, a greater acceleration torque is required.

Figure 13:
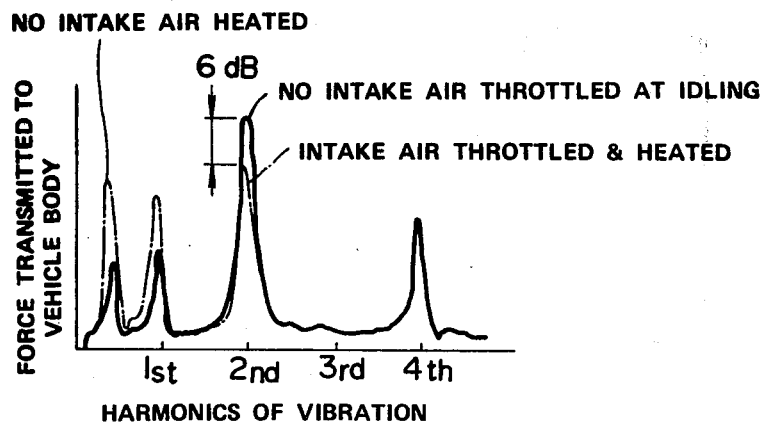
FIG. 13 is a graphical representation of the vibrational characteristics of a diesel engine.

With reference to the vibrational characteristics illustrated in FIG. 13, a four cylinder engine has two explosion (compression) strokes per each engine revolution, vibrating the engine one time at each explosion stroke, which constitutes 2nd harmonics of vibration which is indicated as "harmonics of vibration - 2nd" in FIG. 13. In this connection, if a misfire occurs at one of four cylinders, 0.5th harmonics of vibration increases. This 0.5th harmonics of vibration affects higher harmonics such as 1st and 1.5th harmonics of vibration. Therefore, according to the present invention, 2nd harmonics can be decreased by lowering compression pressure, while suppressing an increase of the harmonics of 0.5th, 1st and the like by heating intake air. Additionally, since the intake air throttle valve 9 is fully closed at idling, intake air noise is damped, thereby achieving further reduction of noise and vibration.

Figure 14:
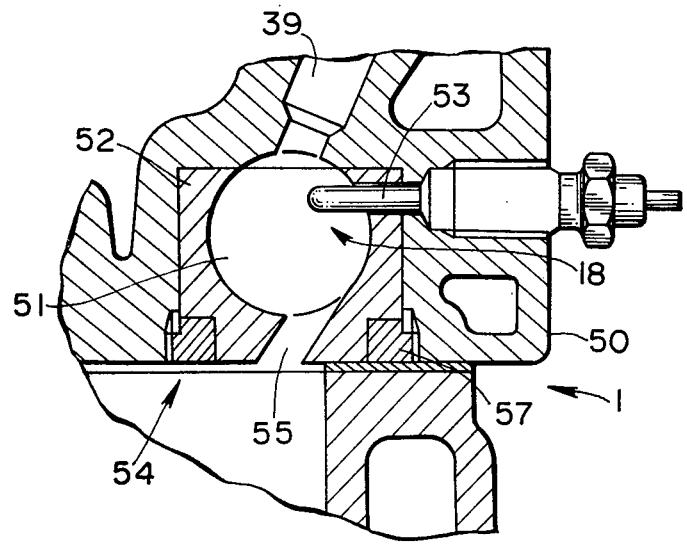
FIG. 14 is a vertical sectional view of an essential part of another embodiment of the vibration suppression system according to the present invention of a diesel engine provided with a precombustion chamber.

FIG. 14 shows an essential part of another embodiment according to the present invention, in which the means 18 for heating intake air or combustion air is formed in the engine proper 1. In this embodiment, a ceramic housing 52 is disposed to almost fully surround a precombustion chamber (turbulence chamber) 51 formed in a cylinder head 50. Additionally, a glow plug 53 forming part of the intake air heating means is disposed to project into the precombustion chamber 51. The glow plug 53 is arranged to be supplied with electric current to be heated simultaneously with the closure of the throttle valve 9 in the low engine speed and low engine load operating range such as idling. It will be appreciated that the temperature around the precombustion chamber 51 is maintained at a sufficiently high level because of a high specific heat of ceramic housing 52. Thus, air flowing from the combustion chamber 54 through an ejection opening 55 into the precombustion chamber 51 is heated by the glow plug 53 and kept warm by the ceramic housing 52. Hence, although the compression pressure is relatively low at a timing in the vicinity of the maximum compression at which timing fuel injection takes place, the temperature within the precombustion chamber can be raised to a level allowing stable ignition of air-fuel mixture. The ceramic housing 52 is, in production, inserted into the cylinder head 50 through the cylinder head bottom surface from the side of the combustion chamber 54, and thereafter fixed in position in a manner to be prevented from comming off by means of a support ring 57.

Figure 15:
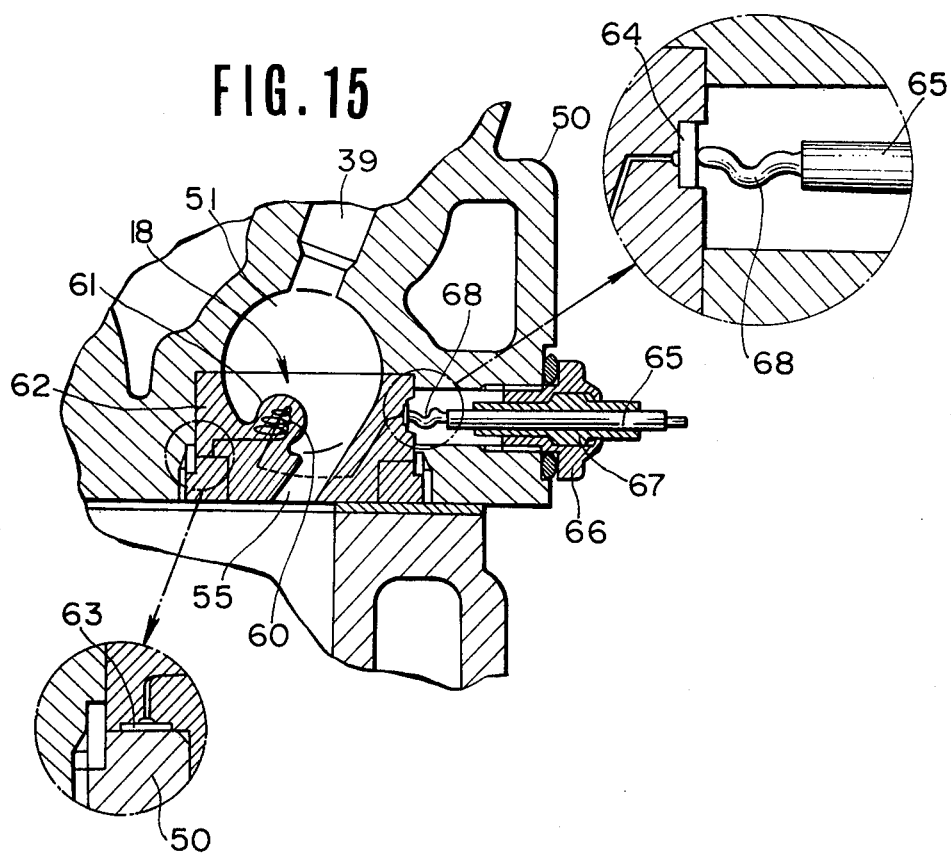
FIG. 15 is a vertical sectional view of an essential part of a further embodiment of the vibration suppression system according to the present invention of a diesel engine provided with a precombustion chamber.

FIG. 15 shows an essential part of a further embodiment according to the present invention, in which the means 18 for heating air includes an ignition ball section 61 formed projected into the precombustion chamber 51. The ignition ball section 61 is provided with a heater 60 embedded therein in order to heat the inside of the precombustion chamber 51. The ignition ball section 61 is formed integrally with a ceramic holder 62 and located opposite a fuel injector 39. The heater 60 has a first terminal 63 grounded to the cylinder head 50, and a second terminal 64 which is conductive to an electrode 65 inserted into the cylinder head 50. The electrode 65 is securely held through an insulator 67 on a screwed plug 66 and in press contact with a terminal 64 through a contact terminal 68. In this embodiment, heat generation from the heater 60 heats the ceramic holder 62 thereby to heat air within the precombustion chamber 51. This ensures stable combustion under the cooperative effect with the ignition of injected fuel by the high temperature ignition ball section 61 during fuel injection. Also in this embodiment, the heater 60 is so arranged as to generate heat together with the closure of the throttle valve 9 only at the low engine speed and low engine load operating range.

Figure 16:
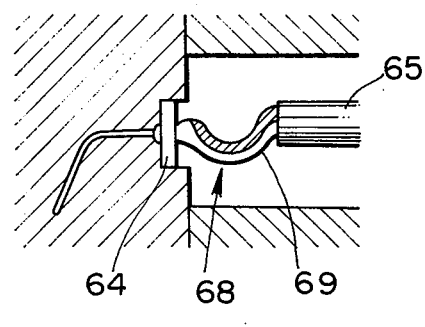
FIG. 16 is a sectional view showing a modified example of a part of the system of FIG. 15.

It is preferable that the contact terminal 68 is formed of a bimetal 69 as shown in FIG. 16, so that when the temperature of the ceramic holder 62 is above a predetermined temperature, the contact terminal 68 deforms to interrupt the electrical connection between the terminal 64 and the electrode 65, thereby omitting unnecessary electricity supply while maintaining stable combustion.

Figure 17:
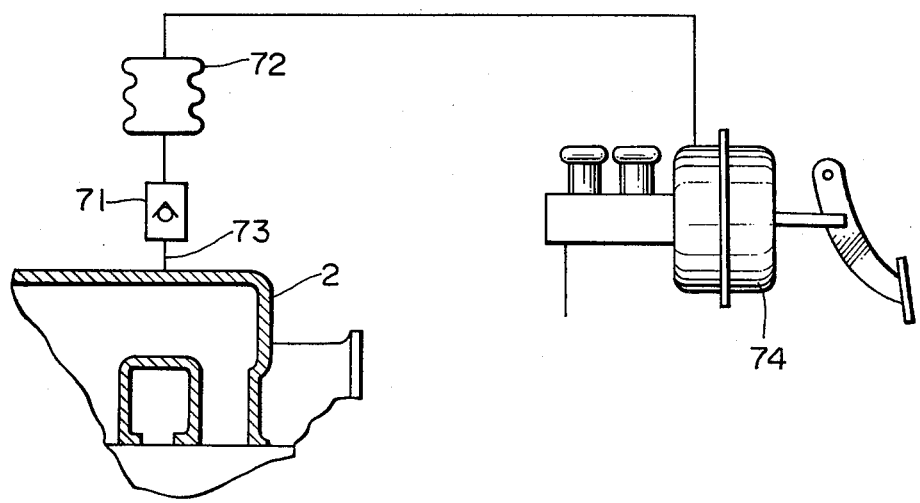
FIG. 17 is a schematic representation showing an intake vacuum taking out device which may be used in the engine of FIG. 1.

Now, it will be understood that a relatively high intake vacuum is generated in the intake manifold 2 when the throttle valve is closed during idling or the like. In this connection, as shown in FIG. 17, the intake manifold 2 is preferably connected through a check valve 71 to a vacuum tank 72 by a conduit 73, so that vacuum can be accumulated in the vacuum tank 72 during idling operation. As a result, the thus accumulated vacuum can actuate a vacuum actuator 74 for driving power brakes and power doors or the like, thereby omitting, or making smaller-sized, a vacuum pump which has been conventionally necessary.

As will be appreciated from the above, according to the present invention, intake air is largely throttled and simultaneously the intake air is positively heated in response to the low engine speed and low engine load operating condition. This lowers compression pressure in the engine to reduce the work for compression, thereby suppressing engine speed fluctuation and torque fluctuation. Additionally, the temperature of compressed air is prevented from lowering to avoid irregular combustion and misfire. Consequently, engine vibration and noise can be greatly reduced while maintaining the stability of the engine operation.

What is claimed is:

1. A system for suppressing vibration of a diesel engine, comprising:
    means operable for decreasing the amount of intake air inducted into the engine;
    means operable for heating the intake air;
    means for detecting a low engine speed and a low engine load operating range of the engine and for producing an output signal when both said low engine speed and low engine load operating range are detected; and means for simultaneously operating said intake air amount decreasing means and said intake air heating means in response to said output signal from said detecting means.

2. A system as claimed in claim 1, wherein said intake air amount decreasing means includes
means defining an intake air passageway leading to a combustion chamber of the engine;
an intake air throttle valve movably disposed within said intake air passageway;
a throttle valve actuator for fully closing said throttle valve in response to said output signal from said detecting means; and
means defining an auxiliary air passage communicating with said intake air passageway and bypassing said throttle valve.

3. A system as claimed in claim 2, wherein said detecting means includes an engine speed responsive means for sensing an engine operating parameter corresponding to engine speed, and an engine load responsive means for sensing an engine operating parameter corresponding to engine load.

4. A system as claimed in claim 3, wherein said intake air heating means includes an electric heater for generating heat when supplied with electric current.

5. A system as claimed in claim 4, wherein said throttle valve actuator comprises a solenoid actuator constructed and arranged to fully close said throttle valve when supplied with electric current.

6. A system for suppressing vibration of a diesel engine, comprising:
means operable for decreasing the amount of intake air inducted into the engine, said intake air decreasing means comprising:
means defining an intake air passageway leading to a combustion chamber of the engine;
an intake air throttle valve movably disposed within said intake passageway;
a throttle valve actuator comprising a solenoid actuator constructed and arranged to fully close said throttle valve when supplied with electric current for fully closing said throttle valve in response to said output signal from said detecting means; and
means defining an auxiliary air passage communicating with said intake air passageway and bypassing said throttle valve;
means operable for heating the intake air, said intake air heating means comprising an electric heater for generating heat when supplied with electric current;
means for detecting a low engine speed and a low engine load operating range of the engine and for producing an output signal when said low engine speed and low engine load operating range are detected, said detecting means comprising an engine speed responsive means for sensing an engine operating parameter corresponding to engine speed, and an engine load responsive means for sensing an engine operating parameter corresponding to engine load;
means for operating said intake air amount decreasing means and said intake air heating means in response to said output signal from said detecting means;
wherein said engine speed responsive means includes an oil pressure switch responsive to engine lubricating oil pressure, said oil pressure switch being electrically connected to said electric heater and said solenoid actuator and arranged to supply electric current to said electric heater and solenoid actuator when the engine lubricating oil pressure is between first and second levels.

7. A system as claimed in claim 6, wherein said engine load responsive means includes an idle detecting switch responsive to movement of a fuel control member for controlling the amount of fuel supplied to the combustion chamber, said idle detecting switch being constructed and arranged to conduct electric current therethrough when said fuel control lever is at a position corresponding to engine idling, said idle detecting switch being electrically connected in series with said oil pressure switch.

8. A system as claimed in claim 6, wherein said oil pressure switch comprises a first contact which is closed when the pressure of the engine lubricating oil is above said first level, and a second contact which is closed when engine lubricating oil pressure is below said second level, said second level being higher than said first level.

9. A system as claimed in claim 4, wherein said electric heater comprises a sheathed heater located in said intake air passageway downstream of said auxiliary air passage and upstream of the combustion chamber.

10. A system as claimed in claim 4, wherein said combustion chamber further comprises a precombustion chamber and said electric heater is a glow plug disposed to project into said precombustion chamber.

11. A system as claimed in claim 10, further comprising means for maintaining the temperature within the precombustion chamber at a high level, said temperature maintaining means including a ceramic housing surrounding the precombustion chamber.

12. A system as claimed in claim 4, wherein said combustion chamber further comprises a precombustion chamber having a ceramic ignition ball section and said electric heater is disposed in said ignition ball section.

13. The system of claim 12 wherein said engine further comprises a cylinder head and said precombustion chamber is formed in said cylinder head and wherein said electric heater is embedded in said ignition ball section and has a first terminal grounded to said cylinder head and a second terminal connected to an electrode which extends into said cylinder head.

14. The system of claim 13 wherein said electrode comprises a bimetallic contact terminal, responsive to the temperature of said ceramic ignition ball section to establish or interrupt contact with said second terminal.

* * * * *